US012488161B2

(12) United States Patent
Muthiah et al.

(10) Patent No.: US 12,488,161 B2
(45) Date of Patent: Dec. 2, 2025

(54) METHOD AND SYSTEM FOR REPRESENTING FUNCTIONAL SIMULATION SPEED IN REAL-TIME USING GUI ELEMENTS

(71) Applicant: HCL America Inc., Sunnyvale, CA (US)

(72) Inventors: Manickam Muthiah, Shrewsbury, MA (US); Sathish Kumar Krishnamoorthy, Madurai (IN); Razi Abdul Rahim, Willowbrook, IL (US)

(73) Assignee: HCL America Inc.

( * ) Notice: Subject to any disclaimer, the term of this patent is extended or adjusted under 35 U.S.C. 154(b) by 913 days.

(21) Appl. No.: 17/712,426

(22) Filed: Apr. 4, 2022

(65) Prior Publication Data

US 2023/0315936 A1 Oct. 5, 2023

(51) Int. Cl.
*G06F 30/20* (2020.01)
*G06F 30/12* (2020.01)

(52) U.S. Cl.
CPC .............. *G06F 30/20* (2020.01); *G06F 30/12* (2020.01)

(58) Field of Classification Search
CPC ................................. G06F 30/20; G06F 30/12
See application file for complete search history.

(56) References Cited

U.S. PATENT DOCUMENTS

| 7,162,403 | B2 | 1/2007 | Nouri et al. |
| 10,198,540 | B1* | 2/2019 | Cohen ................. G06F 30/3308 |
| 10,599,881 | B1 | 3/2020 | Mehrotra et al. |
| 2005/0027500 | A1 | 2/2005 | Cornhill et al. |
| 2016/0142280 | A1* | 5/2016 | Krishnamoorthy ... G06F 11/263 703/20 |
| 2017/0308629 | A1* | 10/2017 | Petras ................. G06F 9/45508 |

FOREIGN PATENT DOCUMENTS

| JP | 2011238137 A | 11/2011 |
| KR | 102304321 B1 | 9/2021 |
| WO | 2017039680 A1 | 3/2017 |

OTHER PUBLICATIONS

Robert G Smith, Measurement of simulation speed: its relation to simulation accuracy, Dept. of Neuroscience Univ. of PA Phila., PA, 19104-6058, Jan. 1994,DOI:10.1007/978-1-4615-2714-5_10, Project: Neuron-C simulation language, "Computation in Neurons and Neural Systems", 1994, Ed. by Frank H. Eeckman, Kluwer Academic Publishers, Boston.

* cited by examiner

*Primary Examiner* — Chuen-Meei Gan
(74) *Attorney, Agent, or Firm* — Kendal M. Sheets

(57) ABSTRACT

This disclosure relates to method and system for representing functional simulation performance for a plurality of simulations in real-time using Graphical User Interface (GUI) elements. For each of the plurality of simulations in a verification environment and upon completing each of a plurality of simulation intervals, the method includes determining a simulation performance value for a simulation interval based on wall clock time lapsed during completion of the simulation interval; calculating, in real-time, an average simulation performance value based on a sum of the simulation performance value corresponding to each of completed simulation intervals from the plurality of simulation intervals; estimating an additional wall clock time required to complete remaining of the plurality of simulation intervals using the average simulation performance value; and updating a special log file with a set of simulation parameters.

16 Claims, 9 Drawing Sheets

⟵400

@8.5 ms:

Simulation Performance in the Last Interval 402a: 150 us / minute

Average Simulation Performance 404a: 80 us / minute

Slowest Performance 406a: 30 us / minute between 0.5 ms and 1 ms simulation timestamps Estimated Times Of Completion 408a (for different Simulation Lengths):
For a 10 ms Sim → In approximately 18 minutes
For a 15 ms Sim → In approximately 81 minutes
For a 20 ms Sim → In approximately 143 minutes
...
...
...

|

|

|

@14 ms:

Simulation Performance in the Last Interval 402b: 155 us / minute

Average Simulation Performance 404b: 90 us / minute

Slowest Performance 406b: 30 us / minute between 0.5 ms and 1 ms simulation timestamps Estimated Times of Completion 408b (for different Simulation Lengths):
For a 15 ms Sim → In approximately 11 minutes
For a 20 ms Sim → In approximately 66 minutes
...
...
...

FIG. 4

METHOD AND SYSTEM FOR REPRESENTING FUNCTIONAL SIMULATION SPEED IN REAL-TIME USING GUI ELEMENTS

TECHNICAL FIELD

This disclosure relates generally to simulation verification, and more particularly to method and system for representing functional simulation performance for a plurality of simulations in real-time using Graphical User Interface (GUI) elements.

BACKGROUND

Functional verification processes may include simulations (such as, RTL or Netlist simulations) that may take several hours or days to complete. Periodically measuring simulation speed (or performance), i.e., the rate at which a simulation is progressing, when a simulation is underway may help in identifying one or more simulation intervals that may be contributing to slowness of the simulation and estimating an amount of wall clock time remaining before the simulation is complete.

In the present state of art, a standard mechanism to automatically periodically measure and report simulation performance when a simulation is in progress does not exist. Further, conventional methods to perform a detailed comparison between simulation performance for various DUTs/SUTs (for example, different flavors of a chip) are laborious and time-consuming.

The conventional techniques fail to provide for monitoring multiple simulations in real-time. There is, therefore, a need in the present state of art for techniques to provide real-time simulation parameters to monitor such simulations.

SUMMARY

In one embodiment, a method for representing functional simulation performance for a plurality of simulations in real-time using Graphical User Interface (GUI) elements is disclosed. In one example, for each of the plurality of simulations in a verification environment and upon completing each of a plurality of simulation intervals, the method includes determining a simulation performance value for a simulation interval based on wall clock time lapsed during completion of the simulation interval. The simulation interval is a difference between two simulation timestamps. Further, for each of the plurality of simulations in a verification environment and upon completing each of a plurality of simulation intervals, the method includes calculating, in real-time, an average simulation performance value based on a sum of the simulation performance value corresponding to each of completed simulation intervals from the plurality of simulation intervals. Further, for each of the plurality of simulations in a verification environment and upon completing each of a plurality of simulation intervals, the method includes estimating an additional wall clock time required to complete remaining of the plurality of simulation intervals using the average simulation performance value. Further, for each of the plurality of simulations in a verification environment and upon completing each of a plurality of simulation intervals, the method includes updating a special log file with a set of simulation parameters. The set of simulation parameters includes at least one of the simulation performance value for the simulation interval, the average simulation performance value, and the additional wall clock time required to complete remaining of the plurality of simulation intervals.

In one embodiment, a Graphical User Interface (GUI) for representing functional simulation performance for a plurality of simulations in real-time on a computing device with a memory, and one or more processors to execute one or more programs stored in the memory is disclosed. In one example, for each of the plurality of simulations in a verification environment and upon completing each of a plurality of simulation intervals, the GUI is configured to update a special log file with a set of simulation parameters. The set of simulation parameters includes at least one of a simulation performance value for a simulation interval, an average simulation performance value determined based on sum of the simulation performance value corresponding to each of completed simulation intervals from the plurality of simulation intervals, and an additional wall clock time required to complete remaining of the plurality of simulation intervals. Further, for each of the plurality of simulations in a verification environment and upon completing each of a plurality of simulation intervals, the GUI is configured to render the one or more GUI elements based on the set of simulation parameters corresponding to each of the plurality of simulations in real-time.

In one embodiment, a system for representing functional simulation performance for a plurality of simulations in real-time using Graphical User Interface (GUI) elements is disclosed. In one example, the system includes a processor and a computer-readable medium communicatively coupled to the processor. For each of the plurality of simulations in a verification environment and upon completing each of a plurality of simulation intervals, the computer-readable medium stores processor-executable instructions, which, on execution, cause the processor to determine a simulation performance value for a simulation interval based on wall clock time lapsed during completion of the simulation interval. The simulation interval is a difference two simulation timestamps. Further, for each of the plurality of simulations and upon completing each of a plurality of simulation intervals, the processor-executable instructions, on execution, cause the processor to calculate, in real-time, an average simulation performance value based on a sum of the simulation performance value corresponding to each of completed simulation intervals from the plurality of simulation intervals. Further, for each of the plurality of simulations in a verification environment and upon completing each of a plurality of simulation intervals, the processor-executable instructions, on execution, cause the processor to estimate an additional wall clock time required to complete remaining of the plurality of simulation intervals using the average simulation performance value. Further, for each of the plurality of simulations in a verification environment and upon completing each of a plurality of simulation intervals, the processor-executable instructions, on execution, cause the processor to update a special log file with a set of simulation parameters. The set of simulation parameters includes at least one of the simulation performance value for the simulation interval, the average simulation performance value, and the additional wall clock time required to complete remaining of the plurality of simulation intervals.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 4 illustrates an exemplary special log file for a simulation, in accordance with an embodiment.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
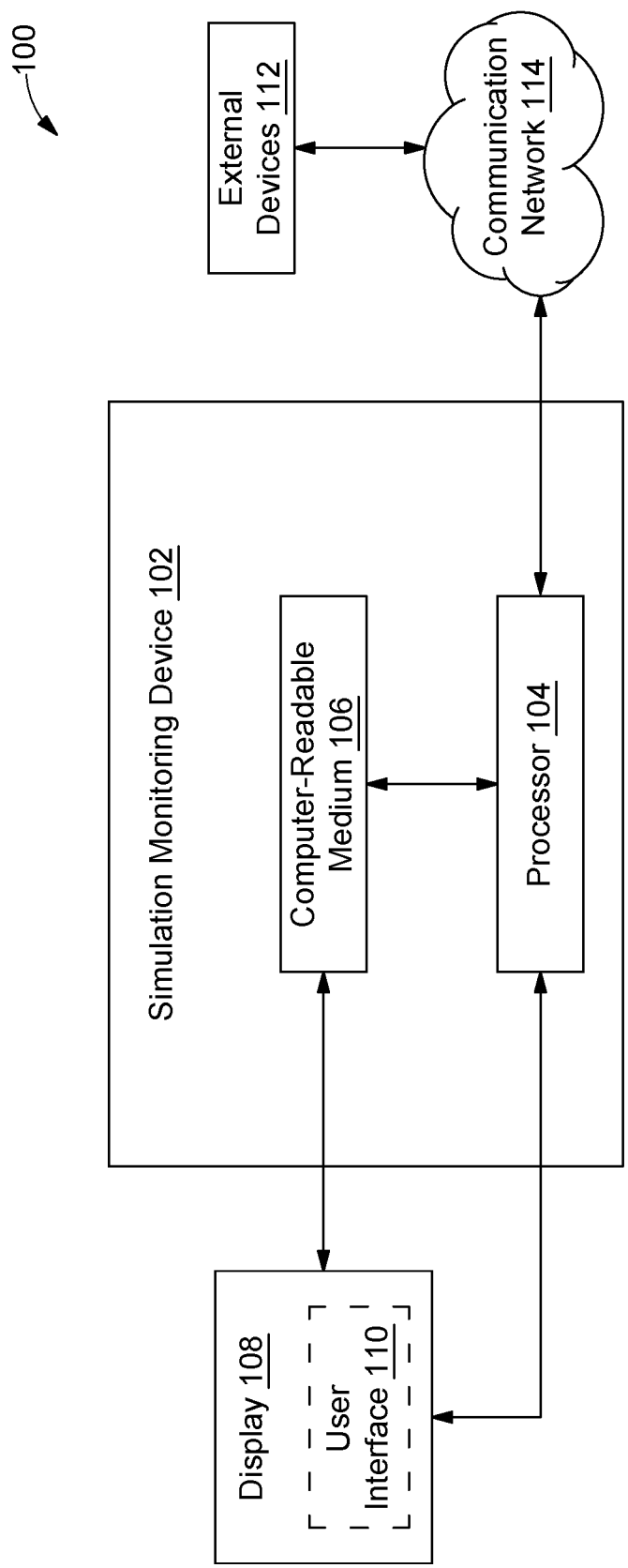
FIG. 1 is a block diagram of an exemplary system for representing functional simulation performance for a plurality of simulations in real-time using Graphical User Interface (GUI) elements, in accordance with some embodiments.

Referring now to FIG. 1, an exemplary system 100 for representing functional simulation performance for a plurality of simulations in real-time using Graphical User Interface (GUI) elements is illustrated, in accordance with some embodiments. The system 100 may implement a simulation monitoring device 102 (for example, server, desktop, laptop, notebook, netbook, tablet, smartphone, mobile phone, or any other computing device), in accordance with some embodiments of the present disclosure. The simulation monitoring device 102 may represent functional simulation performance for a plurality of simulations in real-time using GUI elements.

As will be described in greater detail in conjunction with FIGS. 2-8, for each of the plurality of simulations in a verification environment and upon completing each of a plurality of simulation intervals, the simulation monitoring device 102 determines a simulation performance value for a simulation interval based on wall clock time lapsed during completion of the simulation interval. The simulation interval is a difference between two simulation timestamps. For each of the plurality of simulations in a verification environment and upon completing each of a plurality of simulation intervals, the simulation monitoring device 102 further calculates, in real-time, an average simulation performance value based on a sum of the simulation performance value corresponding to each of completed simulation intervals from the plurality of simulation intervals. For each of the plurality of simulations in a verification environment and upon completing each of a plurality of simulation intervals, the simulation monitoring device 102 further estimates an additional wall clock time required to complete remaining of the plurality of simulation intervals using the average simulation performance value. For each of the plurality of simulations in a verification environment and upon completing each of a plurality of simulation intervals, the simulation monitoring device 102 further updates a special log file with a set of simulation parameters. The set of simulation parameters includes at least one of the simulation performance value for the simulation interval, the average simulation performance value, and the additional wall clock time required to complete remaining of the plurality of simulation intervals.

In some embodiments, the simulation monitoring device 102 includes one or more processors 104 and a computer-readable medium 106 (for example, a memory). The computer-readable medium 106 includes a GUI configured to render one or more GUI elements based on a set of simulation parameters (such as, simulation performance value, average simulation performance value, additional wall clock time required to complete remaining simulation intervals, etc.). Further, the computer-readable medium 106 stores instructions that, when executed by the one or more processors 104, cause the one or more processors 104 to represent functional simulation performance for a plurality of simulations in real-time using GUI elements, in accordance with aspects of the present disclosure. The computer-readable medium 106 also stores various data (for example, simulation performance value, average simulation performance value, additional wall clock time required to complete remaining simulation intervals, special log file, simulation parameters, and the like) that may be captured, processed, and/or required by the system 100.

The system 100 may further include a display 108. The system 100 may interact with a user via a user interface 110 accessible via the display 108. The system 100 may also include one or more external devices 112. In some embodiments, the simulation monitoring device 102 may interact with the one or more external devices 112 over a communication network 114 for sending or receiving various data. The external devices 112 may include, but may not be limited to, a remote server, a digital device, or another computing system.

Figure 2:
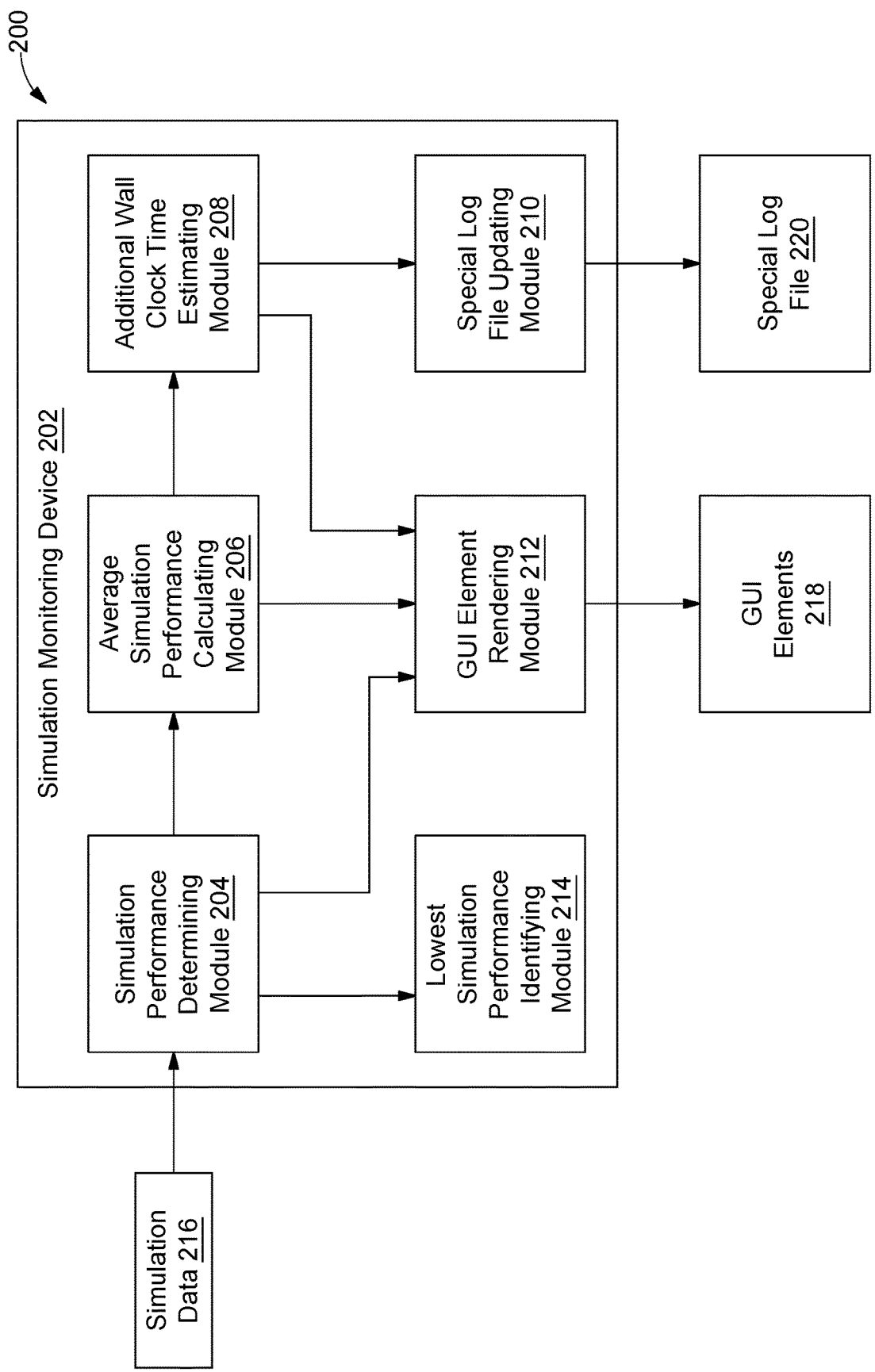
FIG. 2 illustrates a functional block diagram of an exemplary system for representing functional simulation performance for a plurality of simulations in real-time using Graphical User Interface (GUI) elements, in accordance with some embodiments.

Referring now to FIG. 2, functional block diagram of an exemplary system 200 for representing functional simulation performance for a plurality of simulations in real-time using Graphical User Interface (GUI) elements is illustrated, in accordance with some embodiments. The system 200 includes a simulation monitoring device 202. In an embodiment, the simulation monitoring device 202 is analogous to the simulation monitoring device 102 of the system 100. The simulation monitoring device 202 includes a simulation performance determining module 204, an average simulation performance calculating module 206, an additional wall clock time estimating module 208, a special log file updating module 210, a GUI element rendering module 212, and a lowest simulation performance identifying module 214.

The simulation monitoring device 202 receives simulation data 216 corresponding to each of a plurality of simulations in real-time. The simulation data 216 includes simulation timestamps corresponding to a simulation. It should be noted that each of the plurality of simulations is performed over a plurality of simulation intervals. A simulation interval is a difference between two simulation timestamps.

Upon completing each of a plurality of simulation intervals, the simulation performance determining module 204 receives a new set of simulation data 216. Further, the simulation performance determining module 204 determines a simulation performance value for a recently completed simulation interval based on wall clock time lapsed during completion of the simulation interval. In some embodiments, to determine a simulation performance value for a simulation interval, the simulation performance determining module 204 determines the wall clock time lapsed during completion of the simulation interval by calculating a difference between the current wall clock timestamp and a previous wall clock timestamp. Further, the simulation performance determining module 204 determines the simulation interval by calculating a difference between two simulation timestamps. Further, the simulation performance determining module 204 divides the simulation interval by the wall clock time lapsed to obtain the simulation performance value for the simulation interval. Further, for each of completed simulation intervals from the plurality of simulation intervals, the simulation performance determining module 204 sends the simulation performance value in real-time to the average simulation performance calculating module 206 and the lowest simulation performance identifying module 214.

In some embodiments, the simulation monitoring device 202 records the wall clock timestamp at each of a plurality of simulation intervals (for example, every 100 us, 200 us, 500 us, 1 ms, etc.) from start of a simulation until end of the simulation. It may be noted that user may select duration of each of the plurality of simulation intervals. For each of the plurality of simulation intervals, the simulation performance determining module 204 calculates the amount of wall clock time lapsed (in seconds/minutes/hours) at the end of the simulation interval and determines the simulation performance value during the simulation interval.

The average simulation performance calculating module 206 calculates, in real-time, an average simulation performance value based on a sum of the simulation performance value corresponding to each of completed simulation intervals from the plurality of simulation intervals. In some embodiments, to calculate the average simulation performance value, the average simulation performance calculating module 206 determines a sum of the wall clock time lapsed calculated for each of the completed simulation intervals from the plurality of simulation intervals in real-time. Further, the average simulation performance calculating module 206 determines a sum of the completed simulation intervals from the plurality of simulation intervals in real-time. Further, the average simulation performance calculating module 206 divides the sum of the completed simulation intervals by the sum of the wall clock time lapsed to obtain the average simulation performance value. Further, the average simulation performance calculating module 206 sends the average simulation performance value to the additional wall clock time estimating module 208.

The additional wall clock time estimating module 208 estimates an additional wall clock time required to complete remaining of the plurality of simulation intervals using the average simulation performance value. Further, the additional wall clock time estimating module 208 sends the additional wall clock time required to complete remaining of the plurality of simulation intervals to the special log file updating module 210. For example, when current simulation timestamp for a simulation is 1 ms, the additional wall clock time estimating module 208 estimates the additional wall clock time that might be required to reach each of 5 ms, 10 ms, 15 ms, and 20 ms simulation timestamps.

The special log file updating module 210 receives a set of simulation parameters from the simulation performance determining module 204, the average simulation performance calculating module 206, and the additional wall clock time estimating module 208. The set of simulation parameters includes at least one of the simulation performance value for the simulation interval, the average simulation performance value, and the additional wall clock time required to complete remaining of the plurality of simulation intervals. Further, the special log file updating module 210 updates a special log file 220 with the set of simulation parameters.

The lowest simulation performance identifying module 214 identifies lowest simulation performance value from the simulation performance value corresponding to each of the completed simulation intervals from the plurality of simulation intervals received from the simulation performance determining module 204. It should be noted that, in some embodiments, the set of simulation parameters includes the lowest simulation performance value. In such embodiments, the special log file 220 includes the lowest simulation performance value.

Additionally, the GUI element rendering module 212 receives the set of simulation parameters from the simulation performance determining module 204, the average simulation performance calculating module 206, and the additional wall clock time estimating module 208. Further, the GUI element rendering module 212 renders one or more GUI elements 218 based on the set of simulation parameters corresponding to each of the plurality of simulations in real-time. By way of an example, the one or more GUI elements 218 include, but are not limited to, a simulation performance live plot, a graphical simulation speedometer, or the like. The GUI element rendering module 212 and the special log file updating module 210 periodically report each of the set of simulation parameters when the simulation is in progress.

In some embodiments, the simulation monitoring device 202 monitors each of the plurality of simulations through an external script (not shown in figure). By way of an example, the external script may be a system Verilog code. In such embodiments, the simulation monitoring device 202 periodically updates the simulation timestamp in the special log file 220 through a Verilog module or a system Verilog module/class in a system Verilog code. Further, the external script identifies addition of a new simulation timestamp in the special log file. Further, the external script obtains a current wall clock timestamp upon identifying the new simulation timestamp. Further, the external script associates the new simulation timestamp with the current wall clock timestamp through the external script.

It may be noted that the simulation monitoring device 202 can be used to report simulation time advancement issue (for example, an untimed 'while' loop used in testbench causing the additional wall clock remaining to complete the remaining of the plurality of simulation intervals and the simulation to be stuck at a particular simulation timestamp) in a simulation to a user based on the special log file 220 when current simulation timestamp of the simulation is unchanged for a predefined threshold time. The external script monitoring the special log file 220 entries (that includes simulation timestamps and associated wall clock timestamps, if any), may timeout when new simulation timestamp entries do not change in a predefined threshold time. Further, the external script or the simulation monitoring device 202 may take a required action or report the simulation time advancement issues to the user so that the user can take the required action as early as possible.

It should be noted that all such aforementioned modules 204-214 may be represented as a single module or a combination of different modules. Further, as will be appreciated by those skilled in the art, each of the modules 204-214 may reside, in whole or in parts, on one device or multiple devices in communication with each other. In some embodiments, each of the modules 204-214 may be implemented as dedicated hardware circuit comprising custom application-specific integrated circuit (ASIC) or gate arrays, off-the-shelf semiconductors such as logic chips, transistors, or other discrete components. Each of the modules 204-214 may also be implemented in a programmable hardware device such as a field programmable gate array (FPGA), programmable array logic, programmable logic device, and so forth. Alternatively, each of the modules 204-214 may be implemented in software for execution by various types of processors (e.g., processor 104). An identified module of executable code may, for instance, include one or more physical or logical blocks of computer instructions, which may, for instance, be organized as an object, procedure, function, or other construct. Nevertheless, the executables of an identified module or component need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for representing functional simulation performance for a plurality of simulations in real-time using GUI elements. For example, the exemplary system 100 and the associated simulation monitoring device 102 may represent functional simulation performance for a plurality of simulations in real-time using GUI elements by the processes discussed herein. In particular, as will be appreciated by those of ordinary skill in the art, control logic and/or automated routines for performing the techniques and steps described herein may be implemented by the system 100 and the simulation monitoring device 102 either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 3:
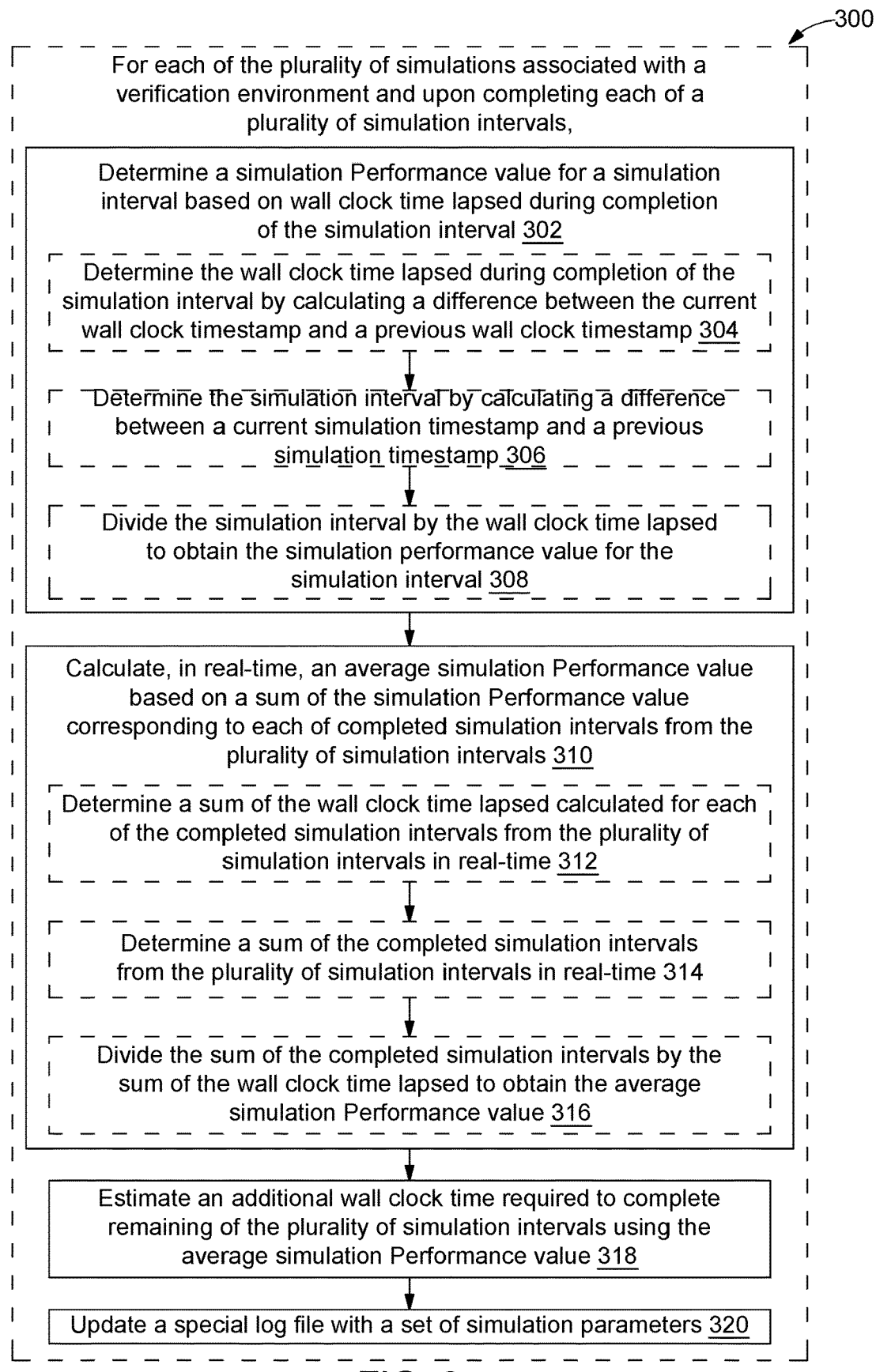
FIG. 3 illustrates a flow diagram of an exemplary process for representing functional simulation performance for a plurality of simulations in real-time using Graphical User Interface (GUI) elements, in accordance with some embodiments.

Referring now to FIG. 3, an exemplary process 300 for representing functional simulation performance for a plurality of simulations in real-time using Graphical User Interface (GUI) elements (for example, the GUI elements 218) via a system (such as, the system 200 or the simulation monitoring device 202) is depicted via a flowchart, in accordance with some embodiments. For each of the plurality of simulations in a verification environment and upon completing each of a plurality of simulation intervals, the process 300 includes determining a simulation performance value for a simulation interval based on wall clock time lapsed during completion of the simulation interval, at step 302. It should be noted that the simulation interval is a difference between two simulation timestamps.

In some embodiments, to determine a simulation performance value for a simulation interval, the process 300 comprises determining the wall clock time lapsed during completion of the simulation interval by calculating a difference between the current wall clock timestamp and a previous wall clock timestamp, at step 304. Further, in such embodiments, to determine the simulation performance value for the simulation interval, the process 300 comprises determining the simulation interval by calculating a difference between the current simulation timestamp and a previous simulation timestamp, at step 306. Further, in such embodiments, to determine the simulation performance value for the simulation interval, the process 300 comprises dividing the simulation interval by the wall clock time lapsed to obtain the simulation performance value for the simulation interval, at step 308. For example, the simulation performance determining module 204 determines the simulation performance value for the simulation interval based on wall clock time lapsed during completion of the simulation interval.

Further, for each of the plurality of simulations in a verification environment and upon completing each of a plurality of simulation intervals, the process 300 includes calculating, in real-time, an average simulation performance value based on a sum of the simulation performance value corresponding to each of completed simulation intervals from the plurality of simulation intervals, at step 310.

In some embodiments, to calculate an average simulation performance value, the process 300 includes determining a sum of the wall clock time lapsed calculated for each of the completed simulation intervals from the plurality of simulation intervals in real-time, at step 312. Further, in such embodiments, to calculate an average simulation performance value, the process 300 includes determining a sum of the completed simulation intervals from the plurality of simulation intervals in real-time, at step 314. Further, in such embodiments, to calculate an average simulation performance value, the process 300 includes dividing the sum of the completed simulation intervals by the sum of the wall clock time lapsed to obtain the average simulation performance value, at step 316. In continuation of the example given above, the average simulation performance calculating module 206 calculates the average simulation performance value based on the sum of the simulation performance value corresponding to each of completed simulation intervals from the plurality of simulation intervals.

Further, for each of the plurality of simulations in a verification environment and upon completing each of a plurality of simulation intervals, the process 300 includes estimating an additional wall clock time required to complete remaining of the plurality of simulation intervals using the average simulation performance value, at step 318. In continuation of the example given above, the additional wall clock time estimating module 208 estimates the additional wall clock time required to complete remaining of the plurality of simulation intervals.

Further, for each of the plurality of simulations in a verification environment and upon completing each of a plurality of simulation intervals, the process 300 includes updating a special log file with a set of simulation parameters, at step 320. The set of simulation parameters includes at least one of the simulation performance value for the simulation interval, the average simulation performance value, and the additional wall clock time required to complete remaining of the plurality of simulation intervals. In continuation of the example given above, the special log file updating module 210 updates the special log file 220 with the set of simulation parameters.

Additionally, in some embodiments, the process 300 includes monitoring each of the plurality of simulations through an external script. In such embodiments, the process 300 includes identifying, by the external script, addition of a new simulation timestamp in the special log file. Further, in such embodiments, the process 300 includes obtaining, by the external script, a current wall clock timestamp upon identifying the new simulation timestamp. Further, in such embodiments, the process 300 includes associating, by the external script, the new simulation timestamp with the current wall clock timestamp through the external script.

In some embodiments, the process 300 includes identifying lowest simulation performance value from the simulation performance value corresponding to each of the completed simulation intervals from the plurality of simulation intervals. The set of simulation parameters includes the lowest simulation performance value. In continuation of the example given above, the lowest simulation performance identifying module 214 identifies lowest simulation performance value from the simulation performance value corresponding to each of the completed simulation intervals. Additionally, in some embodiments, the process 300 includes rendering one or more GUI elements based on the set of simulation parameters corresponding to each of the plurality of simulations in real-time. In continuation of the example given above, the GUI element rendering module 212 renders the GUI elements 218 based on the set of simulation parameters. In some embodiments, the process 300 includes reporting simulation time advancement issue in a simulation to a user based on the special log file 220 when current simulation timestamp of the simulation is unchanged for a predefined threshold time. In some embodiments, to report simulation time advancement issue in a simulation to a user, the process 300 includes monitoring the last recorded current simulation timestamp in the special log file through an external monitoring script. Further, in such embodiments, the process 300 includes causing a timeout of the external monitoring script when the last recorded simulation timestamp is unchanged for a predefined threshold time. Further, in such embodiments, upon causing the timeout of the external script, the process 300 includes reporting the simulation time advancement issue in the simulation to the user. This has been explained in detail in conjunction with FIG. 2.

Referring now to FIG. 4, an exemplary special log file 400 for a simulation is illustrated, in accordance with an embodiment. In some embodiments, a system such as, the system 200 or the simulation monitoring device 202, generates and updates the special log file 400. For each of a plurality of simulation intervals of the simulation (for example, 8.5 ms, 14 ms, etc.), the special log file 400 includes a simulation performance in most recent simulation interval (for example, simulation performance in the last interval 402a and simulation performance in the last interval 402b), average simulation performance up to the most recent simulation interval (for example, average simulation performances 404a and 404b), slowest performance up to the most recent simulation interval (for example, slowest performances 406a and 406b), and estimated time required to complete each of remaining of the plurality of simulation intervals (for example, estimated times of completion 408a and 408b).

In some embodiments, the simulation monitoring device 202 generates the special log file 400 in real-time. In some embodiments, the special log file 400 includes a mapping of a plurality of simulation timestamps and a wall clock timestamp associated with each of the plurality of simulation timestamps. An exemplary mapping may be as follows:

| | |
|---|---|
| 100 us | 12:10:00 |
| 200 us | 12:12:20 |
| 300 us | 12:14:11 |
| 400 us | 12:16:55 |

In some embodiments, an external script continuously monitors/parses the special log file 400. Further, the external script generates/updates live performance plots corresponding to each of the plurality of simulations. The external script or the simulation monitoring device 202 constantly updates live performance plots based on the simulation performance value when a simulation is in progress.

In some embodiments, the simulation monitoring device 202 provides the wall clock timestamp through a system Verilog code (for example, a Verilog module or a system Verilog module/class) and performs further calculations. Alternately, a Verilog module or a system Verilog module/class may print the simulation timestamp periodically in the special log file 400 which may be continuously monitored by the external script. The external script may associate a simulation timestamp with a wall clock timestamp by obtaining the current wall clock timestamp as soon as a new simulation timestamp is detected in the special log file 400. Further, the external script performs calculations and generates/updates the live performance plots.

Figure 5:
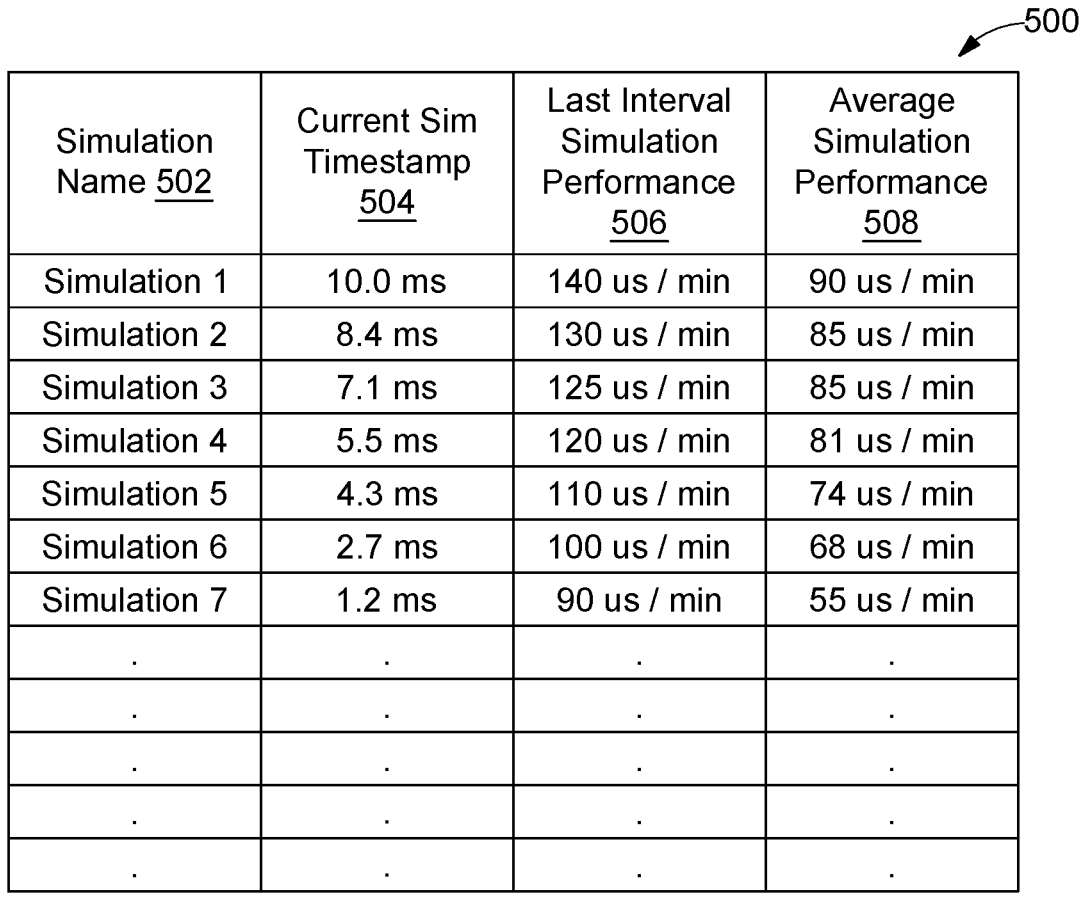
FIG. 5 illustrates a table representing simulation parameters for a plurality of simulations, in accordance with an embodiment.

Referring now to FIG. 5, a table 500 representing simulation parameters for a plurality of simulations is illustrated, in accordance with an embodiment. The table 500 includes simulation parameters corresponding to simulation name 502 of each of the plurality of simulations. The simulation parameters include current simulation timestamp 504, last interval simulation performance 506, and average simulation performance 508. For example, for 'Simulation 1', the current simulation timestamp 504 is '10.0 ms', the last interval simulation performance 506 is '140 us/min', and the average simulation performance 508 is '90 us/min'.

When a plurality of simulations is running simultaneously over different servers or machines (for example, regression runs), a script that parses the special log file corresponding to each of the plurality of simulations periodically and generates/updates a dynamic consolidated simulation performance report (GUI-based or any other type) similar to the table 500, may generate the performance report including the set of simulation parameters corresponding to each of the plurality of simulations running at a time.

Figure 6:
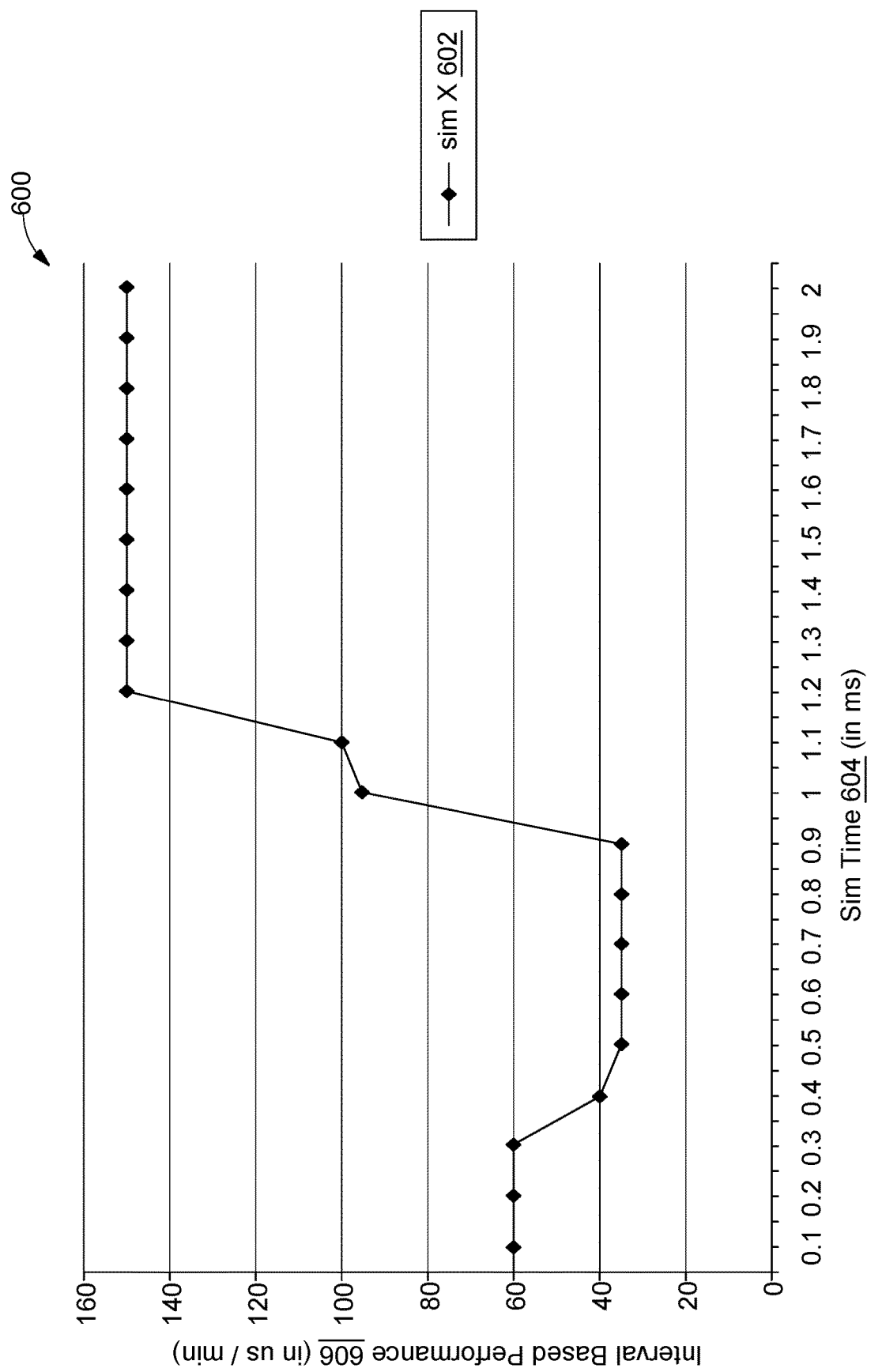
FIG. 6 illustrates a graph depicting performance of a simulation, in accordance with some embodiments.

Referring now to FIG. 6, a graph 600 depicting performance of a simulation is illustrated, in accordance with some embodiments. The graph 600 is a live simulation performance plot corresponding to a simulation 'X' 602. The graph 600 represents simulation time 604 (in ms) on X-axis and interval based performance 606 (in us/min) on Y-axis. Thus, the graph 600 represents changes in the simulation performance value throughout the simulation in real-time.

Figure 7:
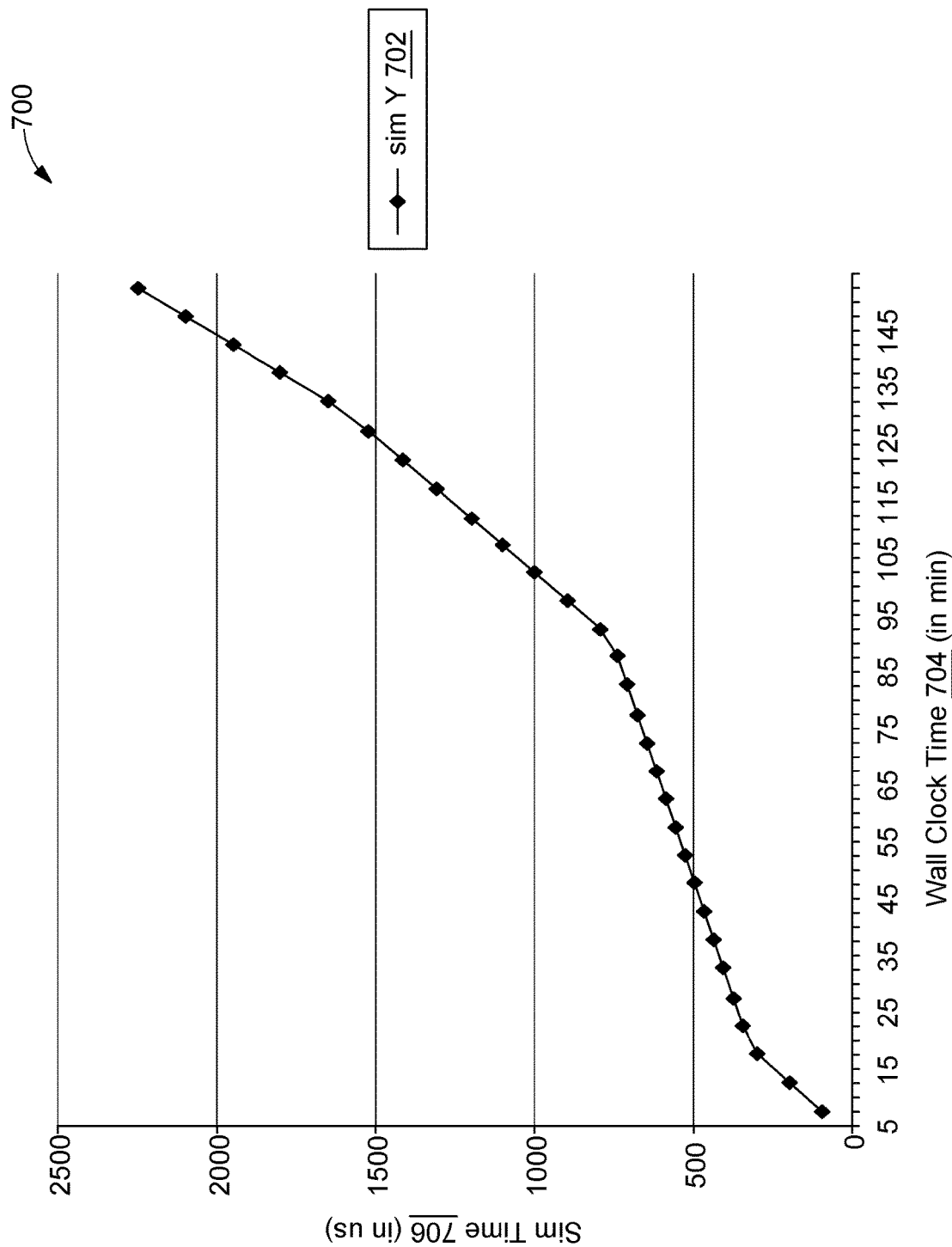
FIG. 7 illustrates a graph depicting performance of a simulation, in accordance with some embodiments.

Referring now to FIG. 7, a graph 700 depicting performance of a simulation is illustrated, in accordance with some embodiments. The graph 700 is a live simulation performance plot corresponding to a simulation 'Y' 702. The graph 700 represents wall clock time 704 (in min) on X-axis and simulation time 706 (in us) on Y-axis. Thus, the graph 700 associates the simulation timestamps of the simulation with the wall clock time in real-time.

Figure 8:
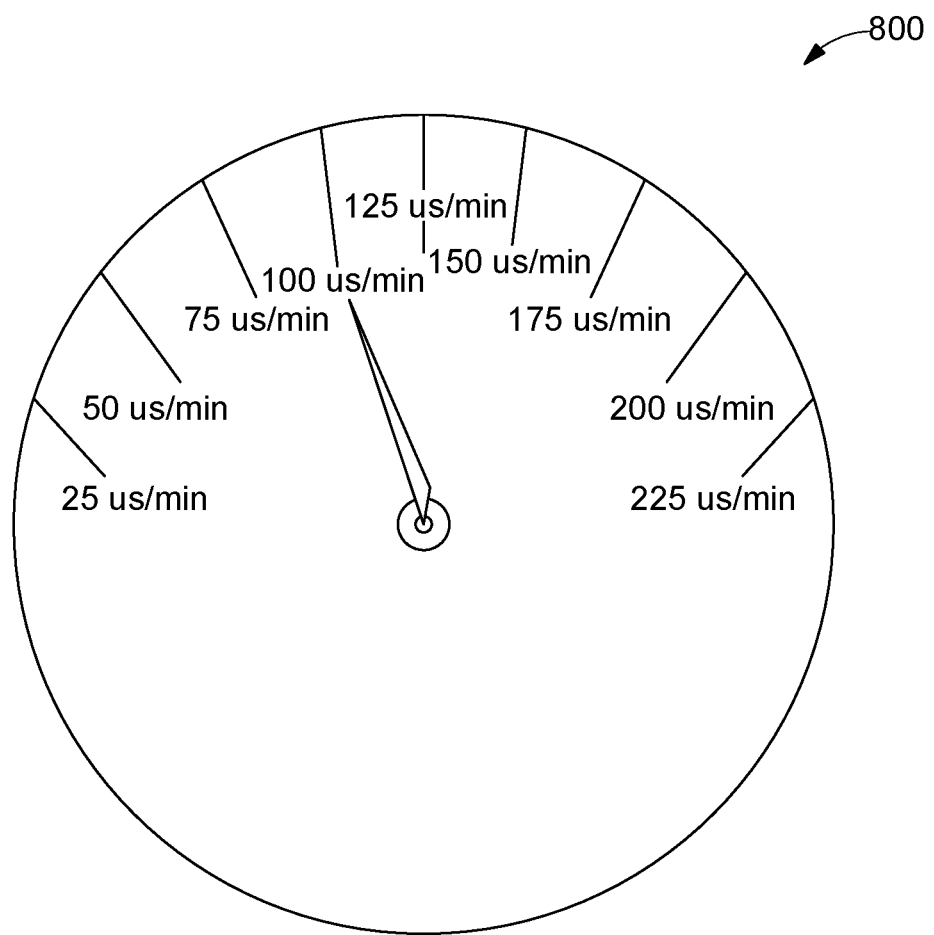
FIG. 8 illustrates an exemplary Graphical User Interface (GUI) element representing functional simulation performance for a simulation in real-time, in accordance with some embodiments.

Referring now to FIG. 8, an exemplary Graphical User Interface (GUI) element 800 representing functional simulation performance for a simulation in real-time is illustrated, in accordance with some embodiments. The GUI element 800 (for example, in form of a simulation speedometer) represents functional simulation performance for a simulation via a GUI in real-time. By way of an example, the simulation performance determining module 204 determines the simulation performance value corresponding to a simulation interval in real-time. Further, the simulation performance determining module 204 sends the simulation performance value to the GUI element rendering module 212. Further, the GUI element rendering module 212 renders the GUI element 800 to graphically display the simulation performance value in real-time.

In some embodiments, the GUI element 800 provides the average simulation performance value at each of the plurality of simulation intervals. The GUI element 800 is implemented as a Verilog module or a system Verilog class/module.

Different parts of a simulation may run at different rates depending upon activity during the corresponding simulation intervals. The GUI element 800 also provides an indication of which simulation intervals consuming a large amount of wall clock time relatively (indicative of CPU time consumed). This information can be used to investigate and understand what caused poor simulation performance during such simulation intervals.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 9:
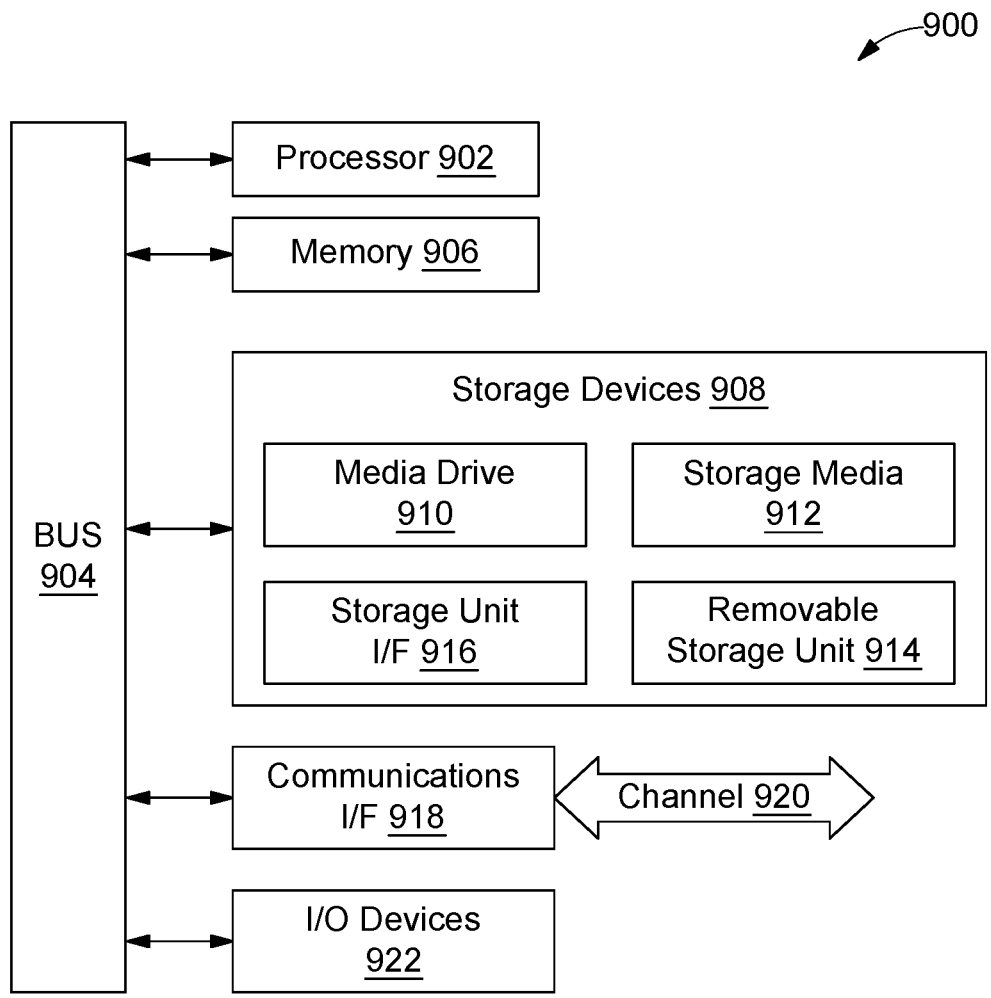
FIG. 9 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 9, an exemplary computing system 900 that may be employed to implement processing functionality for various embodiments (e.g., as a SIMD device, client device, server device, one or more processors, or the like) is illustrated. Those skilled in the relevant art will also recognize how to implement the invention using other computer systems or architectures. The computing system 900 may represent, for example, a user device such as a desktop, a laptop, a mobile phone, personal entertainment device, DVR, and so on, or any other type of special or general-purpose computing device as may be desirable or appropriate for a given application or environment. The computing system 900 may include one or more processors, such as a processor 902 that may be implemented using a general or special purpose processing engine such as, for example, a microprocessor, microcontroller or other control logic. In this example, the processor 902 is connected to a bus 904 or other communication medium. In some embodiments, the processor 902 may be an Artificial Intelligence (AI) processor, which may be implemented as a Tensor Processing Unit (TPU), or a graphical processor unit, or a custom programmable solution Field-Programmable Gate Array (FPGA).

The computing system 900 may also include a memory 906 (main memory), for example, Random Access Memory (RAM) or other dynamic memory, for storing information and instructions to be executed by the processor 902. The memory 906 also may be used for storing temporary variables or other intermediate information during execution of instructions to be executed by the processor 902. The computing system 900 may likewise include a read only memory ("ROM") or other static storage device coupled to bus 904 for storing static information and instructions for the processor 902.

The computing system 900 may also include a storage devices 908, which may include, for example, a media drive 910 and a removable storage interface. The media drive 910 may include a drive or other mechanism to support fixed or removable storage media, such as a hard disk drive, a floppy disk drive, a magnetic tape drive, an SD card port, a USB port, a micro USB, an optical disk drive, a CD or DVD drive (R or RW), or other removable or fixed media drive. A storage media 912 may include, for example, a hard disk, magnetic tape, flash drive, or other fixed or removable medium that is read by and written to by the media drive 910. As these examples illustrate, the storage media 912 may include a computer-readable storage medium having stored therein particular computer software or data.

In alternative embodiments, the storage devices 908 may include other similar instrumentalities for allowing computer programs or other instructions or data to be loaded into the computing system 900. Such instrumentalities may include, for example, a removable storage unit 914 and a storage unit interface 916, such as a program cartridge and cartridge interface, a removable memory (for example, a flash memory or other removable memory module) and memory slot, and other removable storage units and interfaces that allow software and data to be transferred from the removable storage unit 914 to the computing system 900.

The computing system 900 may also include a communications interface 918. The communications interface 918 may be used to allow software and data to be transferred between the computing system 900 and external devices. Examples of the communications interface 918 may include a network interface (such as an Ethernet or other NIC card), a communications port (such as for example, a USB port, a micro USB port), Near field Communication (NFC), etc. Software and data transferred via the communications interface 918 are in the form of signals which may be electronic, electromagnetic, optical, or other signals capable of being received by the communications interface 918. These signals are provided to the communications interface 918 via a channel 920. The channel 920 may carry signals and may be implemented using a wireless medium, wire or cable, fiber optics, or other communications medium. Some examples of the channel 920 may include a phone line, a cellular phone link, an RF link, a Bluetooth link, a network interface, a local or wide area network, and other communications channels.

The computing system 900 may further include Input/Output (I/O) devices 922. Examples may include, but are not limited to a display, keypad, microphone, audio speakers, vibrating motor, LED lights, etc. The I/O devices 922 may receive input from a user and also display an output of the computation performed by the processor 902. In this document, the terms "computer program product" and "computer-readable medium" may be used generally to refer to media such as, for example, the memory 906, the storage devices 908, the removable storage unit 914, or signal(s) on the channel 920. These and other forms of computer-readable media may be involved in providing one or more sequences of one or more instructions to the processor 902 for execution. Such instructions, generally referred to as "computer program code" (which may be grouped in the form of computer programs or other groupings), when executed, enable the computing system 900 to perform features or functions of embodiments of the present invention.

In an embodiment where the elements are implemented using software, the software may be stored in a computer-readable medium and loaded into the computing system 900 using, for example, the removable storage unit 914, the media drive 910 or the communications interface 918. The control logic (in this example, software instructions or computer program code), when executed by the processor 902, causes the processor 902 to perform the functions of the invention as described herein.

Thus, the disclosed method and system try to overcome the technical problem of representing functional simulation performance for a plurality of simulations in real-time using Graphical User Interface (GUI) elements. The method and system are methodology independent and, hence, can be used across any of existing industry-standard verification methodologies. The method and system further allow the user to monitor simulation performance value while a simulation is in progress. The method and system further calculate the simulation performance value in real-time such that the user may not have to wait for the simulation to complete. The method and system further use collected simulation performance value data to compare simulation performance values of two or more DUTs/SUTs (which may be different flavors of a chip) reasonably faster. The method and system further use a live performance plot to understand relation between the simulation performance value and simulation timestamp fairly quickly. The method and system further provide an ability to identify and report simulation time advancement issues to the user as early as possible.

As will be appreciated by those skilled in the art, the techniques described in the various embodiments discussed above are not routine, or conventional, or well understood in the art. The techniques discussed above provide for representing functional simulation performance for a plurality of simulations in real-time using GUI elements. The techniques generate live performance plots corresponding to a plurality of simulations. The techniques then provide a mechanism to identify and report simulation time advancement issues automatically. The techniques then automatically associate simulation timestamp with wall clock timestamp on-the-fly periodically for measuring simulation performance values when the simulation is in progress. The techniques then measuring and reporting simulation performance value on-the-fly. The techniques then identify and report one or more simulation intervals that has the lowest simulation performance value when a simulation is in progress.

In light of the above mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described method and system for representing functional simulation performance for a plurality of simulations in real-time using GUI elements. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for monitoring functional simulation performance in real-time for a plurality of simulations using Graphical User Interface (GUI) elements, the method comprising:

for each of the plurality of simulations associated with a verification environment and upon completing each of a plurality of simulation intervals, determining a simulation performance value for a simulation interval based on wall clock time lapsed during completion of the simulation interval, wherein the simulation interval is a difference between two simulation timestamps;

calculating, in real-time, an average simulation performance value based on a sum of the simulation performance value corresponding to each of completed simulation intervals from the plurality of simulation intervals;

estimating an additional wall clock time required to complete remaining of the plurality of simulation intervals using the average simulation performance value; and updating a special log file with a set of simulation parameters, wherein the set of simulation parameters comprises at least one of the simulation performance value for the simulation interval, the average simulation performance value, and the additional wall clock time required to complete remaining of the plurality of simulation intervals;

rendering one or more GUI elements to a user based on the set of simulation parameters corresponding to each of the plurality of simulations in real-time; and reporting simulation time advancement issue in one or more of the plurality of simulations to the user for taking action, based on the special log file when current simulation timestamp of the current simulation is unchanged for a predefined threshold time.

2. The method of claim 1, further comprising identifying lowest simulation performance value from the simulation performance value corresponding to each of the completed simulation intervals from the plurality of simulation intervals, wherein the set of simulation parameters comprises the lowest simulation performance value.

3. The method of claim 1, further comprising monitoring each of the plurality of simulations through an external script, wherein the monitoring comprises:
   identifying, by the external script, addition of a new simulation timestamp in the special log file;
   obtaining, by the external script, a current wall clock timestamp upon identifying the new simulation timestamp; and
   associating, by the external script, the new simulation timestamp with the current wall clock timestamp.

4. The method of claim 1, wherein determining a simulation performance value for a simulation interval comprises:
   determining the wall clock time lapsed during completion of the simulation interval by calculating a difference between current wall clock timestamp and a previous wall clock timestamp;
   determining the simulation interval by calculating a difference between current simulation timestamp and a previous simulation timestamp; and
dividing the simulation interval by the wall clock time lapsed to obtain the simulation performance value for the simulation interval.

5. The method of claim 4, wherein calculating an average simulation performance value comprises:
   determining a sum of the wall clock time lapsed calculated for each of the completed simulation intervals from the plurality of simulation intervals in real-time;
   determining a sum of the completed simulation intervals from the plurality of simulation intervals in real-time; and
   dividing the sum of the completed simulation intervals by the sum of the wall clock time lapsed to obtain the average simulation performance value.

6. The method of claim 1, wherein reporting simulation time advancement issue in a simulation comprises:
   monitoring last recorded simulation timestamp in the special log file through an external script;
   causing a timeout of the external script when the last recorded simulation timestamp is unchanged for a predefined threshold time; and
   upon causing the timeout of the external script, reporting the simulation time advancement issue in the simulation to the user.

7. A Graphical User Interface (GUI) for monitoring functional simulation performance for a plurality of simulations in real-time on a computing device with a memory, and one or more processors to execute one or more programs stored in the memory, the GUI configured to:
   for each of the plurality of simulations associated with a verification environment and upon completing each of a plurality of simulation intervals,
   update a special log file with a set of simulation parameters, wherein the set of simulation parameters comprises at least one of:
   a simulation performance value for a simulation interval,
   an average simulation performance value determined based on sum of the simulation performance value corresponding to each of completed simulation intervals from the plurality of simulation intervals, and
   an additional wall clock time required to complete remaining of the plurality of simulation intervals;
   render one or more GUI elements to a user based on the set of simulation parameters corresponding to each of the plurality of simulations in real-time; and
   report simulation time advancement issue in one or more of the plurality of simulations to the user for taking action, based on the special log file when current simulation timestamp of the current simulation is unchanged for a predefined threshold time.

8. The GUI of claim 7, further configured to receive the set of simulation parameters in real-time.

9. The GUI of claim 7, wherein the set of simulation parameters further comprises lowest simulation performance value identified from the simulation performance value corresponding to each of the completed simulation intervals from the plurality of simulation intervals.

10. A system for monitoring functional simulation performance for a plurality of simulations in real-time using Graphical User Interface (GUI) elements, the system comprising:
   a processor; and
   a memory communicatively coupled to the processor, wherein the memory stores processor instructions, which when executed by the processor, cause the processor to:
   for each of the plurality of simulations associated with a verification environment and upon completing each of a plurality of simulation intervals,
   determine a simulation performance value for a simulation interval based on wall clock time lapsed during completion of the simulation interval, wherein the simulation interval is a difference between two simulation timestamps;
   calculate, in real-time, an average simulation performance value based on a sum of the simulation performance value corresponding to each of completed simulation intervals from the plurality of simulation intervals;
   estimate an additional wall clock time required to complete remaining of the plurality of simulation intervals using the average simulation performance value;
   update a special log file with a set of simulation parameters, wherein the set of simulation parameters comprises at least one of the simulation performance value for the simulation interval, the average simulation performance value, and the additional wall clock time required to complete remaining of the plurality of simulation intervals;
   render one or more GUI elements to a user based on the set of simulation parameters corresponding to each of the plurality of simulations in real-time; and
   report simulation time advancement issue in one or more of the plurality of simulations to the user for taking action, based on the special log file when current simulation timestamp of the current simulation is unchanged for a predefined threshold time.

11. The system of claim 10, wherein the processor instructions, on execution, further cause the processor to identify lowest simulation performance value from the simulation performance value corresponding to each of the completed simulation intervals from the plurality of simulation intervals, wherein the set of simulation parameters comprises the lowest simulation performance value.

12. The system of claim 10, wherein the processor instructions, on execution, further cause the processor to render one or more GUI elements based on the set of simulation parameters corresponding to each of the plurality of simulations in real-time.

13. The system of claim 10, wherein the processor instructions, on execution, further cause the processor to monitor each of the plurality of simulations through an external script, wherein the monitoring comprises:
identifying, by the external script, addition of a new simulation timestamp in the special log file;
obtaining, by the external script, a current wall clock timestamp upon identifying the new simulation timestamp; and
associating, by the external script, the new simulation timestamp with the current wall clock timestamp.

14. The system of claim 10, wherein to determine a simulation performance value for a simulation interval, the processor instructions, on execution, cause the processor to:
determine the wall clock time lapsed during completion of the simulation interval by calculating a difference between current wall clock timestamp and a previous wall clock timestamp;
determine the simulation interval by calculating a difference between current simulation timestamp and a previous simulation timestamp; and
divide the simulation interval by the wall clock time lapsed to obtain the simulation performance value for the simulation interval.

15. The system of claim 14, wherein to calculate an average simulation performance value, the processor instructions, on execution, cause the processor to:
determine a sum of the wall clock time lapsed calculated for each of the completed simulation intervals from the plurality of simulation intervals in real-time;
determine a sum of the completed simulation intervals from the plurality of simulation intervals in real-time; and
divide the sum of the completed simulation intervals by the sum of the wall clock time lapsed to obtain the average simulation performance value.

16. The system of claim 10, wherein to report simulation time advancement issue in a simulation, the processor instructions, on execution, cause the processor to:
monitor last recorded simulation timestamp in the special log file through an external script;
cause a timeout of the external script when the last recorded simulation timestamp of the simulation is unchanged for a predefined threshold time; and
upon causing the timeout of the external script, report the simulation time advancement issue in the simulation to the user.

* * * * *